United States Patent Office 3,449,475
Patented June 10, 1969

3,449,475
PROCESS FOR MAKING FLAME-PROTECTION COMPONENTS FOR PLASTIC MATERIALS AND CONTAINING PHOSPHORUS AND HALOGEN
Herbert Jenkner, Cologne-Deutz, Germany, assignor to Anstalt fur Montage-Technik, Vaduz, Principality of Liechtenstein
No Drawing. Filed Dec. 13, 1965, Ser. No. 513,530
Claims priority, application Germany, Dec. 15, 1964, C 34,644
Int. Cl. C07f 9/08; C08k 1/60; C09k 3/28
U.S. Cl. 260—967　　　　　　　　　　　　　　　7 Claims

---

ABSTRACT OF THE DISCLOSURE

Flame-protection components for plastic materials produced by reacting halogen-containing tri-esters of phosphorous acid with phosphorus pentoxide in a mol ratio of 1:0.2 to 1:10 at a temperature between 30 and 180° C.

---

The invention relates to a process for making flame-protection components for plastic materials and containing phosphorus and halogen.

Halogen-containing esters of phosphorus acid, for example, tris-(chloroethyl)-phosphite, tris-(bromoethyl)-phosphite, tris-(dibromopropyl)-phosphite, tris-(bromoethylenephenyl)-phosphite and the like can be readily made with good yields by reacting phosphorous trihalogenides such as phosphorus trichloride or tribromide with epoxides such as ethylene, propylene and styrene oxide or epichlorohydrine or epibromohydrine.

These esters of phosphorus acid are effective as flame-protection means in different plastic materials. Frequently, there is the disadvantage that these flame-protection means gradually creep to the surface of the plastics after a period of time and are there removed by exterior influences. In this way the plastic material which was originally combustible only with difficulty gradually becomes combustible again.

Endeavors have therefore been made to discover a flame-protection component for plastics, which component is derived from the esters of phosphorus acid and which does not exhibit this migration tendency.

A process has been found for making flame-protection components for plastic materials and containing phosphorous and halogen. According to this process, halogen-containing esters of phosphorus acid and phosphorus pentoxide are reacted in a mol ratio of 1:0.2 to 1.10 and at temperatures of 30 to 180° C.

To obtain halogen-containing esters of phosphorous acid used as starting material for carrying out the process according to the invention, it is preferred to use, in accordance with the aforementioned process, phosphorus trichloride or tribromide which is reacted with epoxides such as ethylene or propylene oxide, styrene oxide, epichlorohydrine or epibromohydrine.

These halogen-containing esters of phosphorus acid, preferably chloro and/or bromo-containing esters, are mixed in accordance with the invention with phosphorus pentoxide in a mol ratio of 1:0.2 to 1:10 and at temperatures of 30 to 180° C., preferably 60 to 120° C. For this purpose a mixture of the halogen-containing ester of phosphorus acid with phosphorus pentoxide can firstly be made at room temperature and subsequently this mixture can be heated. The phosphorus pentoxide thereby goes into solution and reacts in a weakly exothermic reaction with the ester of the phosphorus acid. But it is also possible firstly to heat the ester of the phosphorus acid or phosphorus pentoxide to the reaction temperature by itself and then to mix the other reaction component therewith.

In those cases in which products of higher viscosity are obtained by these reactions, it is preferable to carry out the reaction in the presence of a diluent or solvent. Here, again, the reaction components can be heated together to the reaction temperature in the diluent or solvent. Of course one of the reaction components and the diluent or solvent can be heated to the reaction temperature before the other reaction component is introduced to this mixture or to this solution. Conversely, one of the reaction components can be heated to the reaction temperature alone, whereafter the other reaction component is added together with the diluent or solvent. In all these cases it may also be advantageous to pre-heat to reaction temperature that reaction component which is added subsequently and, where appropriate, together with the diluent or solvent. By means of simple preliminary tests it is readily possible to determine the most favourable manner of conducting the process according to the invention for making the halogen-and-phosphorus-containing flame-protection components. The quantity of diluent or solvent to be used principally depends on the viscosity of the reaction mixture during the entire reaction process.

For carrying out the process according to the invention, the diluents or solvents that have been found particularly suitable are liquid paraffinic or aromatic hydrocarbons with 5 to 40 carbon atoms in the molecule, for example hexane, light petrol, petroleum ether, paraffin oil, benzene, toluene, xylene and the like. Liquid esters of lower saturated or unsaturated carboxylic acids and lower alkanols, such as propionic acid ethyl ester, methacrylic acid methyl ester and the like, are also suitable. In addition, liquid olefinic hydrocarbons can be used as diluents or solvents, for example octene, styrene and the like.

To carry out the process according to the invention, it is possible to use mixtures of halogen-containing esters of phosphorus acid as well as mixtures of diluents or solvents.

The reaction of the reaction components results in the desired phosphorus-and-halogen-containing flame-protection components which, in certain cases, must be separated from the diluents or solvents by distillation. The flame-protection components themselves are liquids or resinous products ranging from colourless to slightly yellow in colour. The viscosity of these liquids or resinous products increases with an increase in the quantity of phosphorus pentoxide that was reacted per mol of ester of the phosphorus acid.

The flame-protection components made according to the invention can be readily worked into plastic materials and bring about a reduction in the combustibility of these plastics.

The following table contains particulars of examples for carrying out the process according to the invention.

In each case the starting material is the mixture of the reaction components and this mixture, in certain cases mixed with diluents or solvents, is heated to the stated reaction temperature.

| Example No.: | Ester of phosphorous acid | Mol of $P_2O_5$ per Mol of Ester | Solvent | Reaction Temperature in °C. | Theoretical Yield | Content in the end product of— | |
|---|---|---|---|---|---|---|---|
| | | | | | | P (percent by wt.) | Halogen (percent by wt.) |
| 1 | Tris-(bromoethyl)-phosphite | 0.25 | Toluene | 110 | 100 | 10.55 | 54.3 Bromine. |
| 2 | do | 0.5 | do | 110 | 95 | 13.4 | 47.7 Bromine. |
| 3 | do | 1.0 | do | 111 | 80 | 17.0 | 41.3 Bromine. |
| 4 | do | 1.0 | Xylene | 142-148 | | 22.7 | 17.3 Bromine. |
| 5 | do | 0.25 | Benzene | 85-86 | 89 | 11.6 | 52.2 Bromine. |
| 6 | do | 0.5 | do | 84-86 | 86 | 13.8 | 48.5 Bromine. |
| 7 | do | 0.75 | do | 83-84 | 93 | 12.8 | 45.4 Bromine. |
| 8 | do | 1.0 | do | 88 | 90.5 | 17.0 | 42.5 Bromine. |
| 9 | do | 2.0 | do | 85-87 | | 20.7 | 31.6 Bromine. |
| 10 | do | 1.0 | Petroleum ether 40-60 | 45-46 | 97 | 17.5 | 41.3 Bromine. |
| 11 | Tris-(chloroethyl)-phosphite | 1.0 | Toluene | 113 | 83 | 18.65 | 29.5 Chlorine. |
| 12 | do | 0.25 | Benzene | 86-87 | 98 | 15.2 | 33.0 Chlorine. |
| 13 | do | 0.5 | do | 85 | 94 | 18.25 | 30.1 Chlorine. |
| 14 | do | 1.0 | do | 83-84 | 100 | 22.9 | 25.5 Chlorine. |
| 15 | do | 1.0 | Petroleum ether 40-60 | 45-46 | 94 | 22.5 | 24.9 Chlorine. |
| 16 | do | 5.0 | | 80 | 99.5 | 18.0 | 30.55 Chlorine. |
| 17 | Tris-(bromoethyl)-phosphite | 0.5 | | 80 | | 15.5 | 47.9 Bromine. |

I claim:
1. A process for the production of a flame-protection component containing phosphorus and halogen adapted to reduce the combustibility of plastic materials when incorporated therein which comprises reacting a halogen-containing tri-ester of phosphorous acid with phosphorus pentoxide in a mol ratio of 1:0.2 to 1:10 at a temperature of 30 to 180° C.
2. A process according to claim 1 wherein the reaction is carried out in a liquid paraffinic or aromatic hydrocarbon having 5 to 40 carbon atoms in the molecule and which is free from hydroxyl and carboxyl groups.
3. A process according to claim 1 wherein the reaction is carried out in a liquid ester of a lower saturated or unsaturated aliphatic carboxylic acid with a lower alkanol.
4. A process according to claim 1 wherein the reaction is carried out in a liquid olefinic hydrocarbon.
5. A process according to claim 1 in which the halogen-containing tri-ester of phosphorous acid is selected from the group consisting of tris-(bromoethyl)-phosphite and tris-(chloroethyl)-phosphite.
6. A flame-protection component produced by the process of claim 1.
7. A flame-protection component produced by the process of claim 4.

References Cited

UNITED STATES PATENTS

| 2,330,254 | 9/1943 | Whitehead | 106—177 |
| 3,285,774 | 11/1966 | Goldstein et al. | 260—967 XR |
| 3,318,982 | 5/1967 | Klose et al. | 260—980 |

JULIUS FROME, *Primary Examiner.*

L. HAYES, *Assistant Examiner.*

U.S. Cl. X.R.

106—15; 252—8.1; 260—45.7, 920, 921, 926, 980

UNITED STATES PATENT OFFICE
CERTIFICATE OF CORRECTION

Patent No. U.S. 3,449,475          Dated June 10, 1969

Inventor(s) Herbert Jenkner

It is certified that error appears in the above-identified patent and that said Letters Patent are hereby corrected as shown below:

Col. 1, lines 6 and 7 for "Anstalt fur Montage-Technik, Vaduz, Principality of Liechtenstein" read --Chemische Fabrik Kalk GmbH, Koeln, Germany--
Col. 1, line 49 for "1.10" read -- 1:10--
Col. 3, line 27 for "or" read --of--
Col. 4, line 25 for "Claim 4" read -- Claim 5--

SIGNED AND
SEALED
FEB 17 1970

(SEAL)
Attest:

Edward M. Fletcher, Jr.
Attesting Officer

WILLIAM E. SCHUYLER, JR.
Commissioner of Patents